United States Patent [19]

Teodorczyk

[11] Patent Number: 5,367,040

[45] Date of Patent: Nov. 22, 1994

[54] PRECURE RESISTANT THERMOSET RESIN FOR MOLDED WOOD COMPOSITES

[75] Inventor: Zygmunt Teodorczyk, Batavia, Ill.

[73] Assignee: Masonite Corporation, Chicago, Ill.

[21] Appl. No.: 997,867

[22] Filed: Dec. 29, 1992

[51] Int. Cl.$^5$ .............................................. C08G 8/04
[52] U.S. Cl. ..................................... 528/137; 528/139; 528/140; 528/165; 525/501; 427/339
[58] Field of Search ............... 528/137, 139, 140, 165; 525/501; 427/339

[56] References Cited

U.S. PATENT DOCUMENTS

| | | | |
|---|---|---|---|
| 3,293,200 | 12/1966 | MacGregor | 260/17.2 |
| 3,957,703 | 5/1976 | Ludwig et al. | 260/17.5 |
| 3,968,294 | 7/1976 | Robitschek et al. | 428/213 |
| 4,105,606 | 8/1978 | Forss et al. | 260/17.5 |
| 4,111,911 | 9/1978 | Weissenfels et al. | 260/38 |
| 4,113,542 | 9/1978 | Johansson | 156/335 |
| 4,157,324 | 6/1979 | Culbertson | 260/32.8 R |
| 4,306,999 | 12/1981 | Adams et al. | 260/17.5 |
| 4,320,036 | 3/1982 | Gobran et al. | 524/14 |
| 4,324,747 | 4/1982 | Sudan et al. | 264/13 |
| 4,357,454 | 11/1982 | Holmberg et al. | 527/403 |
| 4,433,120 | 2/1984 | Chiu | 525/501 |
| 4,537,941 | 8/1985 | Kambanis et al. | 527/403 |
| 4,579,892 | 4/1986 | Calve et al. | 524/14 |
| 4,701,383 | 10/1987 | Janiga | 428/527 |
| 4,918,116 | 4/1990 | Gardziella et al. | 523/149 |
| 5,173,527 | 12/1992 | Calve | 524/73 |

Primary Examiner—John Kight, III
Assistant Examiner—Richard Jones
Attorney, Agent, or Firm—Marshall, O'Toole, Gerstein, Murray & Borun

[57] ABSTRACT

A process for the production of modified phenol-formaldehyde resins includes the use of a difunctional phenolic compound as the phenolic component of the resins. The inventive resins resist pre-curing and are useful in the production of molded wood composites produced, for example, by wet-dry forming processes.

29 Claims, No Drawings

PRECURE RESISTANT THERMOSET RESIN FOR MOLDED WOOD COMPOSITES

BACKGROUND OF THE INVENTION

1. Field of the Invention

The invention relates generally to modified phenol-formaldehyde resins and products incorporating such resins and, more particularly, the invention relates to the production of a modified phenol-formaldehyde resole useful in the manufacture of molded wood composites with superior surface quality.

2. Description of Related Technology

Synthetic resins, such as phenol-formaldehyde resins, are used as binders in the manufacture of molded wood composites such as man-made fiberboards, e.g. hardboard. Hardboard may be formed in desired shapes and sizes depending on its intended use, for example as a doorfacing or doorskin which is applied to a door body. The principal processes for the manufacture of fiberboards include (a) "wet" processes, (b) "dry" processes, and (c) "wet-dry" processes.

Generally in a wet process, cellulosic fibers (e.g. wood fiber) are blended in a vessel with large amounts of water to form a slurry. The slurry is deposited along with a synthetic resin binder onto a water-pervious support member, such as a fine screen or a Fourdrinier wire, where much of the water is removed to leave a wet mat of cellulosic material having a moisture content of about fifty weight percent. The wet mat is transferred from the pervious support member to a press and consolidated under heat and pressure to form the molded wood composite.

In a dry process, the cellulosic fibers are typically first coated with a thermosetting resin binder, such as a phenol-formaldehyde resin, and are then randomly distributed into a mat by air blowing the resin-coated fibers onto a support member. The mat is then pressed under heat and pressure to cure the thermosetting resin and to compress the mat into an integral consolidated structure.

A wet-dry forming process may be also be used to produce molded wood composites. Generally, in a wet-dry process, a slurry is formed of water, a cellulosic filler, and a resin binder. Sufficient water is then drained from the slurry to form a wet mat. Further water is then removed from the wet mat by drying in order to form a dried mat. The dried mat is then pressed under heat to form the molded wood composite.

Preferably, a wet-dry process begins by blending cellulosic or wood fiber raw material in a vessel with large amounts of water having a pH of less than 7 to form a slurry. This slurry is then blended with the resin binder. The blend is then deposited onto a water-pervious support member, where a large percentage (e.g. 50%) of the water is removed, thereby leaving a wet mat of cellulosic material. This wet mat is then transferred to a drying zone where much of the remaining water is removed. The dried mat is then transferred to a press and consolidated under heat and pressure to form the molded wood composite.

Molded wood composites produced according to the processes described above may, however, have poor surface quality where typical phenolic resins are used as binders. Poor surface quality is indicated where the molded wood composite exhibits poor internal bonding and strength. Further, poor surface quality is also shown where there appear to be layers within the composite which are "flaky" and can be easily peeled away. Where there is poor surface quality, the wood composite may easily break apart and the product is therefore unsatisfactory.

The above-described effects of a poorly bonded surface often result from undesirable pre-curing of the thermosetting phenol-formaldehyde resin prior to full curing of the resin in its final shape in the press. For example, this pre-cure can occur (1) during drying of the wood fiber mat and (2) in the press before the final thickness of the product is achieved.

In order to help prevent the problems associated with poor surface quality when phenolic resins are used as binders, the surface of the molded wood composite may be improved by postpress tempering with drying oils. Many different types of tempering oils may be used, including linseed oil, soybean oil, tung oil, oiticica oil, and unsaturated fatty acid esters. However, the use of these oils increases both cost and production time. In addition, use of such oils is environmentally undesirable. It is therefore desirable to reduce or eliminate the need for such postpress treatment of the molded wood product by preventing pre-cure of the resins utilized in such products.

SUMMARY OF THE INVENTION

It is an object of the invention to overcome one or more of the problems described above.

The invention provides a modified, pre-cure resistant phenol-formaldehyde resole resin which is useful in the manufacture of molded wood composites. The invention also provides a process for producing a molded wood composite which has superior surface quality.

According to the invention, a resole is produced by condensing formaldehyde or a formaldehyde derivative with a difunctional phenolic compound in the presence of an alkaline catalyst. This resole is then utilized in a process such as a wet-dry forming process to produce a molded wood composite. The inventive process obviates the need for further treatment, e.g. tempering with oils, to provide a molded wood composite with high surface quality.

Further objects and advantages of the invention will be apparent to those skilled in the art from the following detailed description, taken in conjunction with the appended claims.

DETAILED DESCRIPTION OF THE INVENTION

According to the invention, a modified, pre-cure resistant phenol-formaldehyde thermoplastic resin is produced by reacting a difunctional phenolic compound with formaldehyde or a formaldehyde derivative in the presence of an alkaline catalyst. The resin is blended with a cellulosic fiber, e.g., wood, and formed into a molded wood composite.

Any difunctional phenolic compound may be used to replace phenol in accordance with the invention. The term "difunctional phenolic compound" is used to refer to phenolic molecules which are capable of reacting with no more than two molecules of formaldehyde (i.e., the phenolic compound exhibits difunctional reactivity with formaldehyde). The hydroxyl group of the phenolic compound is ortho- and para-directing (i.e., the hydroxyl group generates reactivity of the carbon positions which are ortho and para to the hydroxyl group). Therefore, examples of such difunctional compounds useful with the invention include the following: o-cresol, p-cresol, p-tertbutylphenol, p-nonylphenol, p-dodecylphenol, difunctional xylenols (i.e., excluding 3,5-xylenol), and mixtures of these compounds. O-cresol is a preferred compound due to its low cost and availability. Because these compounds are difunctional they will produce a linear polymer which avoids pre-cure when condensed with formaldehyde.

The formaldehyde compound used in accordance with the invention is not limited to formaldehyde itself, but encompasses formaldehyde derivatives, such as furfuryl aldehyde or glyoxal.

Following is an example of a method of producing a resole resin of the type described above, which uses o-cresol as the difunctional phenolic compound described above. However, it is to be understood that the invention is not limited to the use of o-cresol, but encompasses all difunctional phenolic compounds as described above. It should also be understood that there are many modifications and alternatives to the following example and no limitations should be understood therefrom. The invention contemplates, for example, variations of reaction temperature, sequence of the addition of reactants, and selection of reactants. For example, a useful variation of the example which follows includes: mixing a difunctional compound and alkaline catalyst, heating the resulting mixture, e.g. to about 85° C., followed by gradual addition of formaldehyde at 85° C. over a period of time, for example one hour.

According to the example, 31.51 grams of o-cresol (preferably in pure form) is reacted with 38.90 grams of formaldehyde (preferably as a 37 wt. % aqueous solution) in a first step. The reaction preferably utilizes a formaldehyde to o-cresol molar ratio of at least 1:1 and more preferably utilizes a ratio of about 1:1 to 2:1, and most preferably 1.4: to 1.8:1. At lower molar ratios of formaldehyde to difunctional phenolic compound, the resulting resin would not have sufficient bonding properties. At higher molar ratios of formaldehyde to difunctional phenolic compound, the free formaldehyde content in the resin may be excessive and might require a significant amount of ammonia or other formaldehyde scavenger to lower the level of formaldehyde.

An alkaline catalyst is selected, which preferably is caustic soda (NaOH), but may also be, for example, potassium hydroxide (KOH) or combinations of NaOH and KOH. Preferably, a first increment of 1.79 grams of caustic soda is added as a 50 wt. % aqueous solution to the mixture under full vacuum at a temperature below 45° C. Because the reaction between formaldehyde and a phenolic compound under alkaline conditions is highly exothermic, the temperature of the reactants will immediately begin to rise, and the reaction temperature therefore should be carefully controlled. To ensure safe control of the reaction temperature, the increase in temperature is preferably paused at various predetermined temperature plateaus. Such a pause may be accomplished by vacuum and/or water cooling. Once the temperature begins to drop under the vacuum and/or water cooling, the temperature is then allowed to increase. In a preferred embodiment, the rise in reaction temperature is temporarily paused at 50° C., 55° C., and 60° C. Once the temperature reaches about 65° C., the increase in reaction temperature is paused for about 75 minutes. 3.07 grams of caustic soda (also in the form of a 50 wt. % aqueous solution) is preferably added to the reaction before the reaction temperature reaches about 70° C., followed by a temperature increase to about 80° C.

After the reaction mixture reaches a desired viscosity, preferably in the range of about 120 to 200 cps, the mixture is cooled as rapidly as possible to about 35° C. At or below this temperature, 9.51 grams of aqueous caustic soda is illustratively added, followed by the addition of further water. The amount of free formaldehyde in the reaction mixture is then preferably measured, and a sufficient amount of an ammonia solution (e.g., 25 wt. % aqueous solution) is then added as a formaldehyde scavenger. For example, 15.1 lbs. of a 25 wt. % ammonia solution may be added per 1000 lbs. of resin per percent of free formaldehyde. In a final step, the final product is cooled to about 25° C. for use in a forming process or temporary storage.

The reaction preferably uses a total caustic soda to difunctional phenolic compound molar ratio of 0.2:1 to 1:1, and preferably 0.3:1 to 0.7:1. A particular preferred resin recipe as described in the preceding example is shown in the Table below, although as stated above many other variations may be used. In the Table, the three amounts of caustic soda reflect the above-described stepwise addition of caustic soda.

TABLE

| Reactant | Weight Percent (Based on Total Ingredients) | Concentration of Solution |
| --- | --- | --- |
| O-Cresol | 31.51 | Pure |
| Formaldehyde | 38.90 | 37 wt. % |
| Caustic soda | 1.79 | 50 wt. % |
| Caustic soda | 3.07 | 50 wt. % |
| Caustic soda | 9.51 | 50 wt. % |
| Water | 15.22 | Pure |
| Ammonia | — | 25 wt. % |
| Total | 100.00 | |

The resole resin produced in accordance with the invention may also be used in combination with an additional phenolic resin. When such a combination is used in a process for making a molded wood composite, the additional phenolic resin may be either (a) pre-blended with the inventive resin or (b) introduced into a blend with the inventive resin and the cellulosic filler used to make the composite. In such a use, the weight of the inventive resole resin is preferably about 5 to 100% of the weight of the total resin, more preferably about 20% to 80%, and the two resins are most preferably combined at a weight ratio of about 1:1. Any type of phenolic resin may be utilized, and incorporation of inexpensive phenolic resins is particularly useful in order to reduce the total cost of the resin.

Further, although it is not essential to the invention, a ligno product may be used in the manufacture of the modified phenol-formaldehyde resin. Lignosulfonates, for example, may be incorporated during the above-described condensation reaction in order to improve resin dispersibility in the process water. Such lignosulfonates may be obtained from spent sulfite cooking liquor from the pulping of wood, as described in Janiga U.S. Pat. No. 4,701,383, which is incorporated herein by reference.

The resole resin produced according to the above-described procedure is alkaline-soluble and is therefore in aqueous solution after the above-described condensation reaction, due to the presence of caustic soda or other alkaline catalyst and water. A cellulosic particle slurry, e.g. wood fiber slurry in process water, is provided, for example at a concentration of about 1–2 wt. % cellulosic material. The resin is incorporated into the wood fiber slurry in a stock line which may be a tank or a moving production line. The turbulence of the transportation of the materials generally provides sufficient energy to mix the materials, and therefore no special mixing machinery is necessary. The process water of the slurry is preferably generally at pH 4 to 6, and neutralizes any caustic soda still present from the condensation of formaldehyde with cresol. As a result, the alkaline-soluble resin will therefore become insoluble in the process water, causing the resin to precipitate in the form of a fine floc on the wood fiber the slurry. Therefore, the alkaline catalyst is used only to condense the above-described monomers and to build up the desired molecular weight of the polymer, and therefore not function in the final resin curing process.

After the resin is incorporated with the process water slurry, this mixture is placed on a water-impervious screen which removes excess water from the mixture, thereby forming a wet mat. This step in combination with the step described in the preceding paragraph will both (a) neutralize the caustic which remains with the resin and (b) physically washes away any excess caustic soda. As a result, the process according to the invention permits greater usage of alkaline catalyst. The ability to use higher levels of catalyst gives the resin the beneficial qualities of: (a) an increased molecular weight, (b) improved resin flocculation, and (c) higher resin stability.

The wet mat is next transported to a drying zone, where the moisture content is still further reduced, as by heating. As the mat leaves the drying zone, the moisture content is preferably reduced to about 6 wt. %.

After the mat has been sufficiently dried, it is placed in a press where the mat is pressed under heat to produce a molded wood composite. Preferably, the pressing temperatures is greater than 400° F., and most preferably, the pressing temperature is greater than 430° F., but low enough to prevent combustion of the wood, which may generally occur at about 500° F.

Because the molded wood composite has superior surface quality without any further treatment, the need for (a) tempering the product with oils or (b) prepress sealers is either greatly reduced or eliminated. After the molded wood composite has been pressed, it may be immediately transported for coating, gluing or other finishing to complete a desired product for commercial use.

The inventive process and resin are useful in any wet-dry process used for the manufacture of molded wood composites, including hardboards. For example, the inventive resin may be used in the manufacture of doorskins from wood fiber. A doorskin is pressed into a pre-selected decorative shape, typically at a thickness of about one-eighth of an inch, and then secured to a door.

The density of a hardboard product produced in accordance with the invention is preferably greater than about 0.8 grams per cubic centimeter. The use of the resin is not limited to the manufacture of molded wood composites, and may be used in any process which demands a superior resin pre-cure resistance.

The foregoing description is given for clearness of understanding only, and no unnecessary limitations should be understood therefrom, as modifications within the scope of the invention will be apparent to those skilled in the art.

I claim:

1. A process for the preparation of a modified, pre-cure resistant phenol-formaldehyde resole resin comprising:
   reacting a difunctional phenolic compound with formaldehyde in the presence of an alkaline catalyst to form said resole, wherein the molar ratio of formaldehyde to difunctional phenolic compound is at least about 1:1.

2. The process of claim 1 wherein said molar ratio is in the range of about 1:1 to about 2:1.

3. The process of claim 2 wherein said molar ratio is in the range of about 1.4:1 to about 1.8:1.

4. The process of claim 1 wherein:
   said alkaline catalyst comprises NaOH; and
   the molar ratio of NaOH to said difunctional phenolic compound is about 0.2:1 to about 1:1.

5. The process of claim 1 further comprising the step of:
   blending said resole resin with a second phenolic resin to form a resin blend.

6. The process of claim 5 wherein:
   the weight of said resole resin is at least about 5% of the total weight of said resin blend.

7. The process of claim 6 wherein:
   the weight of said resole resin is about 20 to 80% of the total weight of said resin blend.

8. The process of claim 7 wherein:
   the weight of said resole resin is about 50% of the total weight of said resin blend.

9. A modified, pre-cure resistant phenol-formaldehyde resole resin for use in a wet-dry forming process, said resole resin comprising the alkaline-catalyzed reaction product of a difunctional phenolic compound and formaldehyde wherein the molar ratio of difunctional phenolic compound to formaldehyde is about 1:1 to about 1:2.

10. A modified, pre-cure resistant phenol-formaldehyde molding composition, said composition comprising:
    (a) a resole resin comprising the alkaline-catalyzed reaction product of a difunctional phenolic compound and formaldehyde wherein the molar ratio of formaldehyde to difunctional phenolic compound is at least about 1:1; and
    (b) a cellulosic filler.

11. The process of claim 10 wherein said molar ratio is in the range of about 1:1 to about 2:1.

12. The process of claim 11 wherein said molar ratio is in the range of about 1.4:1 to about 1.8:1.

13. The composition of claim 10 and further comprising a second phenolic resin.

14. The composition of claim 13 wherein:
    the weight of said resole resin is at least about 5% of the total weight of said resole resin and said second resin.

15. The composition of claim 14 wherein:
    the weight of said resole resin is about 20 to 80% of the total weight of said resole resin and said second resin.

16. The process of claim 15 wherein:
    the weight of said resole resin is about 50% of the total weight of said resole resin and said second resin.

17. A process for the preparation of a molded wood composite, comprising the steps of:
    (a) reacting a difunctional phenolic compound with formaldehyde at a molar ratio of formaldehyde to difunctional phenolic compound of at least about 1:1 in the presence of an alkaline catalyst to form a pre-cure resistant resole resin;

(b) forming a slurry of water, a cellulosic filler, and said resin;

(c) draining sufficient water from the product of step (b) to form a wet mat;

(d) removing water from said wet mat by drying to form a dried mat; and (e) pressing said dried mat under heat to form a molded wood composite.

18. The process of claim 17 wherein:
said process excludes a tempering step.

19. The process of claim 17 or 18 wherein:
said dried mat is pressed at a temperature greater than about 430° F. to produce said molded wood composite.

20. The process of claim 17 wherein:
said water slurry has a pH of less than 7.

21. The process of claim 17 wherein said molar ratio is in the range of about 1:1 to about 2:1.

22. The process of claim 21 wherein said molar ratio is in the range of about 1.4:1 to about 1.8:1.

23. The process of claim 17 wherein:
said alkaline catalyst comprises NaOH; and
the molar ratio of NaOH to said difunctional phenolic compound is about 0.2:1 to 1:1.

24. The process of claim 17 further comprising the step of:
blending said resole resin with a second phenolic resin to form a resin blend.

25. The process of claim 24 wherein:
the weight of said resole resin is at least about 5% of the total weight of said resin blend.

26. A molded wood product made by the process of any one of claims 17–25.

27. A modified, pre-cure resistant phenol-formaldehyde resole resin made by the process comprising:
reacting a difunctional phenolic compound and formaldehyde at a molar ratio of formaldehyde to difunctional phenolic compound of at least about 1:1 in the presence of an alkaline catalyst.

28. In a process for the preparation of a modified phenol-formaldehyde resole comprising reacting a phenolic compound with a formaldehyde compound in the presence of an alkaline catalyst, a procedure for resisting pre-cure of the resole, said procedure comprising:
using a difunctional phenolic compound to react with said formaldehyde.

29. In a process for the preparation of a modified phenol-formaldehyde resole useful in forming molded wood composite products, a procedure for improving the surface quality of the products, said procedure comprising:
using a difunctional phenolic compound to react with said formaldehyde.

* * * * *

UNITED STATES PATENT AND TRADEMARK OFFICE
CERTIFICATE OF CORRECTION

PATENT NO.    :   5,367,040

DATED         :   November 22, 1994

INVENTOR(S)   :   ZYGMUNT TEODORCZYK

It is certified that error appears in the above-identified patent and that said Letters Patent is hereby corrected as shown below:

Column 6, line 46, delete "process" and insert --composition--;

Column 6, line 48, delete "process" and insert --composition--; and

Column 6, line 60, delete "process" and insert --composition--.

Signed and Sealed this

Twentieth Day of February, 1996

*Attest:*

BRUCE LEHMAN

*Attesting Officer*   Commissioner of Patents and Trademarks